May 29, 1956 A. G. BADE 2,747,434
INFINITELY VARIABLE SPEED TRANSMISSION
Filed May 14, 1951 2 Sheets-Sheet 1

Inventor
ALFRED G. BADE
By
Miles Henninger
Attorney

May 29, 1956          A. G. BADE          2,747,434
INFINITELY VARIABLE SPEED TRANSMISSION
Filed May 14, 1951          2 Sheets-Sheet 2
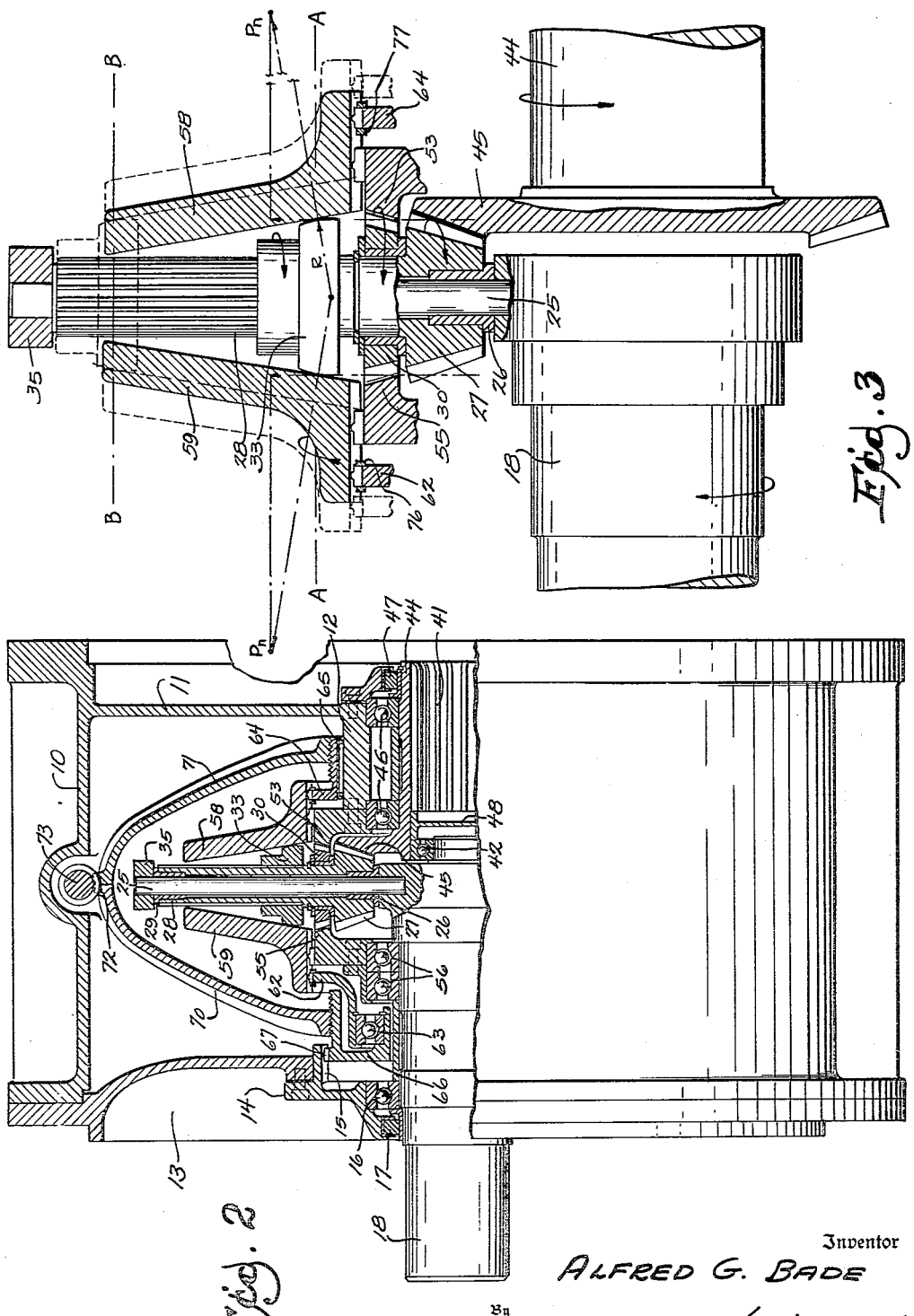
Inventor
ALFRED G. BADE
By Miles Henninger
Attorney

United States Patent Office

2,747,434
Patented May 29, 1956

2,747,434
INFINITELY VARIABLE SPEED TRANSMISSION

Alfred G. Bade, Milwaukee, Wis., assignor to The Falk Corporation, Milwaukee, Wis., a corporation of Wisconsin Application May 14, 1951, Serial No. 226,163

29 Claims. (Cl. 74—796)

This invention relates to improvements in infinitely variable speed-changing power transmissions of the type in which the speed of one shaft varies while the speed of the other shaft is constant, the speed of the one shaft varying from above to below that of the constant speed shaft.

Where prime movers are used chiefly to supply power for a given purpose for which the power demand varies widely, it may also be desirable to use the same prime mover as a source of power for a second device requiring a constant speed. An example of a drive meeting the above conditions, is an engine of aircraft where the speed of the accessory drive shaft (which may be connected by gearing with the engine crank shaft), may vary from 3000 to 10,000 R. P. M. and where it is desired to drive an alternating current generator at a constant speed of 6000 R. P. M. during the time the engine speed varies, for example, between 1000 and 3300 R. P. M. The mechanical devices heretofore available, by which an infinite speed variation could be obtained over a sufficiently wide range, have a number of limitations such as the amount of power transmissible, the gyroscopic effect of some parts which produces extremely high localized pressures, and unbalanced forces which tend to cause variation in the operation and short life of the speed changing devices.

It is therefore an object of the present invention to provide an infinitely variable speed changing transmission in which the speed of the one shaft varies from below to above the speed of another shaft to be driven at a constant speed value.

Another object of the invention is to provide a variable speed changing transmission in which power is transmitted at an infinitely variable rate from a shaft operating at a speed less than, or several times more than, the speed of another shaft which is to be operated at a constant speed.

Another object of the invention is to provide an infinitely variable speed changing transmission in which a major portion of the power transmitting elements "float" or shift their position relative to other parts to equalize the contact pressures between the parts.

Another object of the invention is to provide an infinitely variable speed-changing transmission of the type in which the speed is varied by interaction of mechanical elements and in which the speed changing elements are interconnected to divide the torque reaction and to transfer such reaction to relatively stationary parts.

Another object of the invention is to provide an infinitely variable speed-changing power transmission of the type in which the speed changing elements are sets of friction or adhesion elements and in which such elements are subjected substantially only to centrifugal force to exert the necessary traction effort, a constant speed being obtained by varying the permitted circumference upon which the friction elements may centrifugally seek their path of travel against their complementary friction element.

Another object of the invention is to provide an infinitely variable speed-changing power transmission in which rollers and disks are the speed-changing adhesion type elements and have coacting surfaces at the same angle so that a powerful wedging action may be exerted on one set of the elements with little force applied to the other set of elements to shift the position of the said one set of elements relative to the axis of the variable speed shaft driving the said one set of elements.

A further object of the invention is to provide an infinitely variable speed-changing power transmission utilizing rollers and disks as the speed changing elements and in which the rollers are independent and act independently upon the disks for changing the speed of one of the shafts of the transmission.

And another object of the invention is to provide an infinitely variable speed-changing transmission in which the speed changing elements are of the adhesion or friction type and are in themselves symmetrical and symmetrically arranged so that gyratory forces and vibrations are minimized, in which the bearings are not required to withstand pressures varying within wide limits. The forces involved are largely centrifugal and in an adjustment for change of ratio these forces are kept in balance. The speed changing elements while mounted for centrifugal response for movement to a different circumferential path, are confined by strong, balanced rings which not only provide control surfaces to change speed ratios, but also provide the working surfaces against which the adhesion or friction elements operate.

Generally, the present embodiment of the invention comprises a shaft to be driven at constant speed from a shaft driven at variable speeds ranging from below the constant speed value to several times such value. The variable speed shaft bears a number of rollers on spoke-like projections from the shaft so that centrifugal force acts on the rollers upon rotation of the shaft. The rollers are movable radially of the shaft and rotate on their axes due to friction between the rollers and movable disks in contact with the rollers at diametrically opposite points. The contacting surfaces of the rollers are at an angle to the axis of the rollers and the contacting disk surfaces are at a similar angle. The position of the disks relative to the rollers controls the distance of the rollers from the axis of the variable speed shaft and hence varies the mechanical advantage obtained by enlarging or diminishing the radius of the path traveled by the rollers. The centrifugal force may thus be altered to counteract or compensate for the different speeds of rotation of the variable speed shaft.

The disks are mounted for movement at an angle to the axes of the rollers as well as toward and away from such axes; wherefore, the disks adjust themselves or "float" as required by the pressures acting thereon. A yoke acts on oppositely threaded parts for causing movement of the disks toward and away from each other as the yoke is moved. The force required for moving the yoke is small and while the instant invention involves no specific control of the yoke, it will be understood that any form of manual or automatic means for adjusting the yoke may be utilized.

The roller contacting surfaces of the disks are conical planes and the roller edges contacting with such surfaces are crowned to obtain substantially a line effect of such surfaces. The pressures acting between the rollers and disks are a pressure which is normal or perpendicular to the plane of the disks at the line of contact, and a tangential pressure in the plane of rotation of the line of contact. The pressures between the rollers and each of the disks are equalized by transmitting reaction from a fixed disk by way of gearing to the other and rotating disk. Power is transmitted from the driving shaft to the driven shaft by way of the rollers and planetary gearing connecting the rollers with the driven shaft.

Objects and advantages other than those above set forth, will be apparent from the following description when read in connection with the accompanying drawing, in which:

Fig. 2 is a partial elevation and partial sectional view taken on the plane of line 2—2 of Fig. 1; and Fig. 3 is an enlarged somewhat diagrammatic view illustrating the path of power flow through the device.

Figure 1:
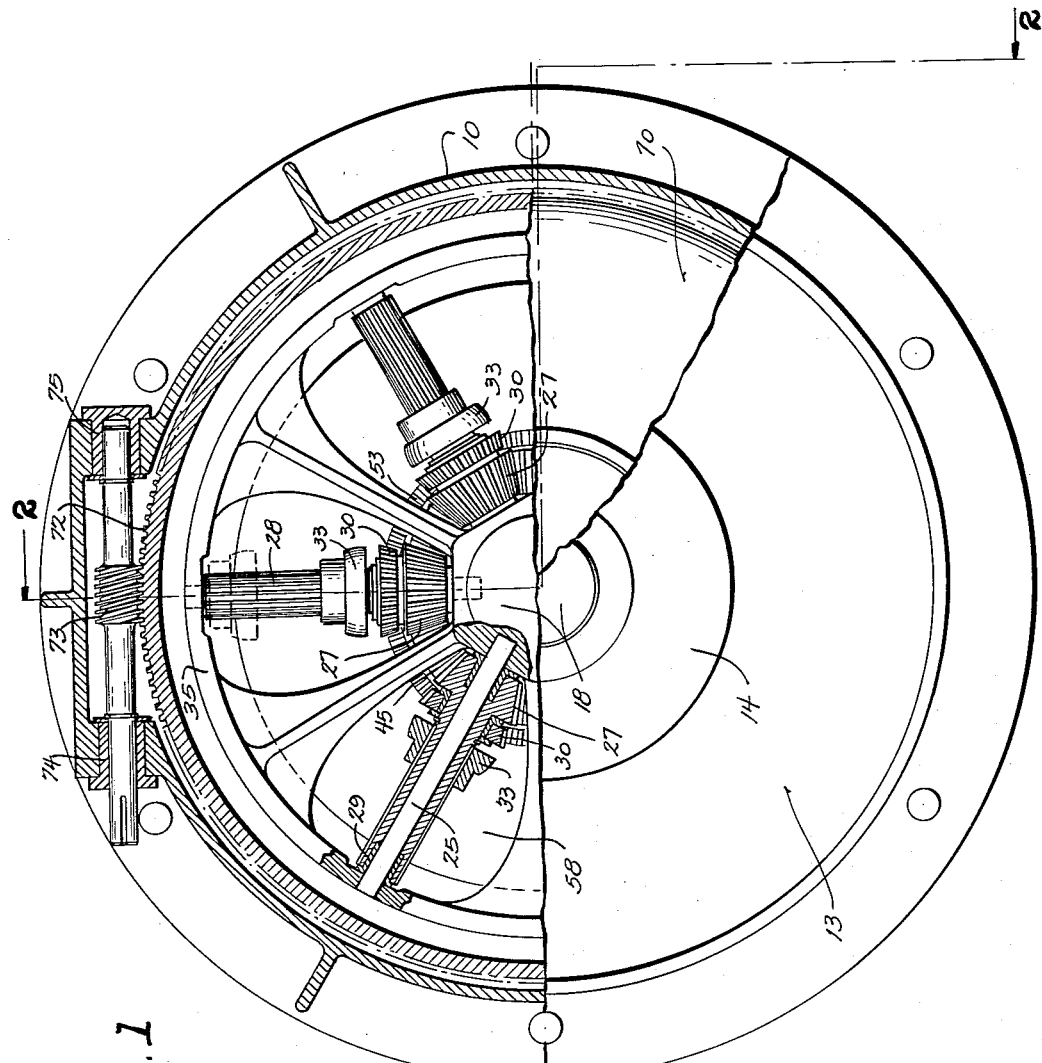
Fig. 1 is a view partially in elevation and partially in section on a plane transverse to the direction of power flow through a transmission embodying the present invention.

Referring to the drawings by reference numerals in which like numerals designate like parts, a housing is formed from a member having a side wall portion 10 and an end wall portion 11 integral therewith, the end wall having a central aperture and a flange 12 defining the aperture and reentrant into the side wall housing portion. Another end wall portion 13 is formed as a substantially annular disk attachable to the side wall 10, the two end walls and the side wall providing an enclosure with aligned apertures through the end walls. The housing end wall 13 receives and has attached thereto a plate 14 with a cylindrical portion internally splined as indicated at 15. Plate 14 provides a mounting for a bearing 16 and has attached thereto a lubricant seal 17 in which a first shaft 18 is mounted. In the present instance such shaft is assumed to be a power input shaft and to be driven at speeds varying from 3000 to 10,000 R. P. M.

The shaft 18 has an enlarged portion within the housing to provide a plurality of sockets (six in number in the present construction) which are equidistant about the shaft periphery and have their center lines on radii of the shaft. Spoke-like members 25 are severally mounted in the shaft sockets to provide axles for the rotation of elements mounted thereon. A bushing type bearing 26 is mounted on each of the axles 25 and seats on the enlargement of shaft 18 to support a planet bevel pinion 27 with a hub-like extension 28 from one side of the gear. The gear hub extensions 28 are severally supported on bearings 29 mounted on the axles 25 and each of the gear hubs 28 supports a bearing on which is mounted a freely rotatable bevel pinion 30. The external surfaces of the gear hubs 28 are splined for severally receiving the internal splines of rollers 33 having a peripheral adhesion or friction surface at an angle to the axis of the rollers and crowned for coaction with other elements to be described. The contact diameter of each roller 33 is equal to the pitch diameters of bevel pinions 30 and 27. The members 25 are joined at their outer ends by a ring 35 and provide axles for rotation of the pinions 27 and their hub extensions 28. The hub extensions form quill shafts for the rollers, on which the rollers may move toward or away from the axis of the variable speed shaft 18 and on radii of said shaft.

A hollow and second shaft (assumed herein to be the output shaft to be driven at a constant speed of 3,300 R. P. M.) extends into the housing through the aperture in the housing end wall 11 and is internally splined as indicated at 41 for receiving the shaft of a device to be driven at constant speed.

The second shaft provides a support in part for first shaft 18 by way of bearing 42 for the stub end of first shaft 18. Second shaft 41 is preferably part of a sleeve-like extension 44 forming the hub of a bevel gear 45. Bearings 46 support the shaft 44 and bevel gear 45 in the flange 12 of the housing end wall 11 and the space between such flange and the gear hub is closed by a seal 47. An oil seal 48 is interposed between the ends of second shaft splines 41 and bearings 42. It will be seen that the bevel pinions 27 engage the bevel gear 45.

A bevel gear 53 is fixed on the end of the housing flange 12 and is engaged by the idler bevel pinions 30 which are mounted for free rotation on the gear hubs 28 and the gear 53 is externally splined for a purpose which will appear hereinafter. The fixed gear ring 53 extends about the axes of shafts 18 and 41 and engages the idler bevel pinions 30 on one side of a plane through the axes of the spoke-axles 25. A second bevel gear 55, generally similar to the gear 53 has a splined portion similar to that of the gear 53 and is mounted on bearings 56 on the shaft 18. The second gear 55 also extends about the axes of the shafts 18 and 41 and engages the idler bevel pinions 30 on the other side of a plane through the axes of spoke-axles 25.

The splines of the gears 53 and 55 are severally engaged by splines on the hub-like portions of substantially conical disks 58 and 59, the disk splines being internally of the hubs thereof. The disks 58 and 59 are also on opposite sides of a plane through the axes of the spoke-axles 25 and define a space of which two sides are at an angle similar to the angle of the adhesion surfaces on the rollers 33. Hence, a line on each of the crowned, adhesion surfaces of the rollers may contact with the adjacent and plane surfaces of the disks at the ends of a diameter through the rollers. By movement of the disks, pressure may be exerted on the rollers to cause positioning of such rollers at any desired distance from the axis of the shaft 18.

The splines on the disks 58, 59 are also severally engaged by angle rings having splined or toothed peripheral edges acting as dental connections with the disks. One ring 64 is supported on a bearing 65 shown as being of the needle type and the ring has a cylindrical portion with an external thread thereon. Another angle ring 62 has a portion supported on a bearing 63 within another ring 66 flanged for defining a substantially cylindrical space, the ring 66 having splines 67 engageable with the splines 15 of housing plate 14 and having an externally threaded cylindrical portion similar to the threaded portion of ring 64, the two threads mentioned being of the same pitch but opposite hand. It will be understood that the bearing 63 takes up axial thrust only and that it does not support the disk 59 in a radial direction. Therefore, the disk 59 is free to adjust itself angularly relative to the axis of the shaft 18 and the axes of roller 33, the disk being supported in a radial direction only by its dental coupling with the gear 55. The bearing 65, however, supports the disk 58 in radial direction so that such disk can adjust itself only in the direction of the axis of shaft 18. The entire sub-assembly comprising disks 58 and 59 and the members supporting disk 59 are thus self-centering.

The cylindrical portions of ring 64 and member 66 extend along the axes of the shafts 18 and 44 and severally receive threads formed on the legs 70, 71 of a hollow ellipsoidal yoke having a thread 72 at least partially about the periphery of the yoke to serve as a worm wheel fragment. The worm wheel 72 is engaged by a worm 73 mounted in bearings 74 and 75 in a portion of the housing side wall. The dental connections of the disks 58, 59 and angle rings 62, 64 are limited by pairs of rings 76, 77, snapped into grooves in the disk dentals.

The housing is fixed to the prime mover and the gear 53 is fixed to the housing and holds the disk 58 against rotatable movement relative to the housing. The gear 55 is however rotatable on the bearings 56 so that such ring gear does not restrain movement of the disk 59. Angle ring 62 is generally annular and is mounted upon its bearing 63 for rotation with disk 59, while angle ring 64 is likewise annular and is dentally connected with disk 58, and since disk 58 is dentally connected with gear 53 fixedly mounted with respect to flange 12 and the housing 10—11, the angle ring 64 does not rotate independently of the housing. However, each of the angle rings 62 and 64 is adjustable parallel with the axes of shafts 18, 41, 44 under control of the yoke. The relatively high normal pressures between the adhesion elements are confined to the yoke sub-assembly and do not react on or revert to other parts where such pressures would be disturbing to the usual operating conditions of the device. When the yoke 70, 71 is rotated, the angle ring 64 and the flanged ring 62 are urged toward or away from each other. Hence, the disks 59 and 58 are moved toward or away from each other to vary the space between the disks. Change of disk spacing allows the rollers to move from the positions shown, outwardly under the action of centrifugal force, or forces the roller inwardly from an outward position as the disks 59 and 58 are pressed toward each other. The self-aligning dental connection between rings 67 and 62 permits the disk 59 to adjust itself at an angle to a plane through the axes of the axle members 25 so that the pressures at all of the roller-disk contact points are always equal and provide a large number (twelve) contact pressure points by which power may be transmitted. The torque reactions on disks 58 and 59 are equalized by the action of the idler bevel gears 30 meshing with the ring gears 53 and 55.

Referring now to Fig. 3, assuming that the shaft 18 is rotated in the direction shown and that the spoke-axles 25 and planet bevel gears 27 and rollers 33 are rotating about the axis of the shaft, the rollers 33 rotate about their axes due to friction between the rollers and the disks. Roller rotation is transmitted to bevel pinions 27 which mesh with bevel gear 45 and the motion of such gear is transmitted to output shaft 41.

When the input speed is at its highest value, the rollers 33 should be in the position A shown (in Fig. 3), and should move from that position toward the dotted line position B as the input shaft speed decreases. Such movement is accomplished by turning the yoke 70, 71 in a direction to move disks 58 and 59 away from each other to reduce a restraining action of the disks on the rollers and allow the rollers to assume position B. As the rollers 33 move radially outwardly from the position A to position B during the continued rotation of shaft 18, it will be obvious from the above description that the path of travel of the peripheral frictional surface against the surfaces of the disks 58, 59 will be increased, and even though the speed of rotation of the shaft 18 may be reduced, and speed of rotation of the rollers 33 about their own axes will be increased. The increased speed of rotation of the rollers is reflected of course in increased speed of rotation of the beveled pinions 27 on the respective splined hubs on which the respective rollers are mounted. Since the speed of rotation of the driven shaft 41 is a composite of the speed of rotation of the input shaft 18 and the speed of rotation of the beveled pinions 27 engaged with beveled gear 45, it is apparent that the increased speed of the rollers 33 as they are adjusted outwardly upon the disks 58, 59 determines the speed of rotation of shaft 41. Furthermore, it will be noted that as the speed of rotation of shaft 18 is reduced, and desirably the shaft 41 should be increased in speed of rotation with reference to the given speed of the shaft 18 so as to hold the constant speed of shaft 41, rollers 33 will be moved outwardly upon the splined hubs of the beveled pinions 27 into positions where they will respond to increased centrifugal force. Increased centrifugal force upon the rollers 33 results in a much more intimate contact and a much more effective frictional engagement between the outer surfaces of the rollers 33 and the disk surfaces against which they impinge. In addition to these factors, there is the added factor that while called upon to perform a given work while shaft 18 is at a slower speed, the friction elements or rollers 33 are permitted to travel a much increased length of circumferential path. Viewing this from the point of view of friction drive, this is equivalent to an increase in moment arm. In the contrary condition where the speed of shaft 18 increases, the maintenance of constant speed on the output shaft requires the adjustment of the disks 58, 59 toward one another so as to confine the rollers 33 in positions more closely approaching the axes of shafts 18, 44. Frictional contact pressures between the rollers and the disks remain high because the centrifugal forces are high at the higher shaft speed and the speed of rotation of the beveled pinions 27 is relatively reduced because of shorter path of travel defined by the path of contact between the roller 33 and a particular disk.

When input speed rises from a low value in which the rollers are in position B, the yoke is turned to bring disks 58 and 59 toward each other. A powerful wedging action is thus exerted on the rollers to move them toward the axis of shaft 18 and thus reduce the moment arm of the centrifugal force.

To explain the operation of the transmission above described, it may be said that the input or driving shaft 18 is connected to the output or driven shaft 41 by power connections therebetween including the beveled pinions 27 mounted upon their respective radial shafts 25 and beveled gear 45 on the driven shaft 41. In the absence of other drives, there would of course be no power transmitted between shafts 18 and 41 because the beveled pinion 27 would act merely as an idler, but if some constraining means to influence the speed of rotation of the beveled pinion 27 is provided, then power may be transmitted from the one shaft to the other, and it is with the constraining means influencing the speed of rotation of this driving connection that this invention is concerned.

It has already been explained that the pitch diameter of the roller 33 is the same as the pitch diameter of the beveled pinion 27, and since the roller is splined upon the hub of the beveled pinion, the two rotate together at the same speed. Assuming that the roller 33 is in the position indicated by the dot-dash line A in Fig. 3, and the disks 58, 59 are so adjusted as to confine the roller in this position against outward radial centrifugally induced sliding motion on the splines of the beveled pinion hub, the rotation of the driving shaft 18 will cause the roller to be driven frictionally by the fixed disk 58 at a number of revolutions per minute dictated by such frictional engagement and determined by the lineal extent of the circumference of the particular circle which the roller follows in its path around the disk in view of the particular number of R. P. M. of the shaft 18. Obviously, since this path of travel is along a circumference of a circle which is greater in radius than the circumference which is followed by the beveled pinion 27, and the beveled pinion 27 is in engagement with beveled gear 45, the beveled pinion tends to rotate under the constraint of the roller 33 faster than it would normally rotate if no constraint were put upon it and it were to rotate as an idler in mesh with the gear 45. Therefore, the more rapidly rotated pinion 27 forces shaft 41 to rotate in the direction opposite the direction of rotation of shaft 18 as shown by the arrows in Fig. 3.

Despite centrifugal force upon the roller 33 tending to throw it outwardly upon the splines of the hub of pinion 27 even though the rotation of shaft 18 may be rapid, disks 58, 59 are held by the yoke 70, 71 and the roller is confined so that a wedging action takes place with resultant adhesion force to increase the efficiency of the engagement for power drive.

When the disks 58, 59 are adjusted outwardly to permit an outward adjustment of the roller 33 on its spline mounting, the roller will assume a position to take an increased circumference upon an increased radius relative to shaft 18. This will give greater speed of rotation to the pinion 27 and greater speed of rotation of shaft 41 in the direction of the arrow. Throughout the range of adjustment of the disks 58, 59, the disks move equally oppositely under the threaded adjustment of the yoke upon the angle rings 62 and 64, and when they move toward each other to force the roller 33 inwardly radially to follow a shorter and circumferentially smaller path, the centrifugal forces upon the plurality of rollers 33 are balanced since rollers are forced to conform to the same circumferential path and all of the major centrifugal forces are "absorbed" by the rigid disks 58, 59 or by the shafts 25, or by the yoke 70, 71. Any of these major forces can only be carried by the bearings in an incidental way.

It will be understood that a selected gear ratio between pinion 27 and gear 45 may be such that at a particular speed desired for a heavy power requirement the roller 33 may be positioned outwardly radially to an extreme position of adjustment and in such outward position of adjustment greater centrifugal forces are applied to insure a more positive frictional engagement between roller 33 and disks 58, 59.

While the disks 58, 59 hold the rollers 33 in balanced restraint against centrifugal force, the rollers 33 and the idler pinions 30 drive the gears 55 and the parts dentally connected with such gears 55, but such drive is converted into rotary motion of the disk 59, the gear 55, the angle ring 62 and ring 66. The disk-yoke sub-combination includes flexible connection means whereby the disks adjust axially and as a unit to equalize the pressures of the rollers on both disks.

As compared to prior adhesion or mechanical types of speed changing devices, the present structure provides the advantages of minimum gyroscopic forces, of obtaining torque at the ends of a diameter of each planetary adhesion element and of providing a plurality of independent adhesion planetary elements with equalized pressures at all pairs of adhesion surfaces. The gyroscopic forces are those forces acting on all parts mounted on the spokes 25 and which rotate both about the axis of the shafts 18, 41—44 and about the spokes 25 of which the axis is perpendicular to the shaft axis. The present structure therefore provides capacity for transmission of greater quantity of power than was possible with the prior devices as well as producing increased life and quieter operation even at such greater capacity. For a given capacity, the present device is more compact than those now known and the adhesion elements are symmetrical so that the vibration is minimized. The reaction or reversion of pressures other than the usual operating pressures on the bearings, is minimized so that less heat is produced, the bearings sizes may be decreased and adequate lubrication is simpler than in other adhesion types of speed exchangers.

Although but one embodiment of the present invention has been illustrated and described, it will be apparent that various changes and modifications may be made therein without departing from the invention as defined in the appended claims.

I claim:

1. In a power transmission for changing a variable speed to a constant speed and vice versa, a variable speed shaft, rollers subjected to centrifugal force by rotation of the variable speed shaft, the rollers severally having a peripheral edge at an angle to the axis of the rollers, a constant speed shaft, gearing connecting the rollers and the constant speed shaft, a pair of disks each having a surface engageable with the rollers at diametrically opposite points on the rollers and said surfaces being radially outwardly convergent, the disks having the adjacent and roller contacting surfaces at the angle of the peripheral edges of the rollers, and means for mounting the disks for movement in a given relation with the roller axes and at an angle to such axes.

2. In a power transmission for changing a variable speed to a constant speed and vice versa, a housing, a variable speed shaft, rollers mounted on and adjustably slidably subject to centrifugal force by rotation of the variable speed shaft, a constant speed shaft, gearing connecting the rollers and the constant speed shaft, a pair of movable disks frictionally engaging the rollers therebetween and providing a radially outwardly constricted annular path for the rollers, the disks severally having internally splined hub extensions, and peripherally toothed rings engaging the disk splines for movement of the disks laterally relative the axis of the rollers, one of the toothed rings being rotatably mounted on portions of the housing.

3. In a power transmission for changing a variable speed to a constant speed and vice versa, a variable speed shaft, rollers subjected to centrifugal force by rotation of the variable speed shaft, a constant speed shaft, gearing connecting the rollers with the constant speed shaft, a pair of disks for severally and frictionally engaging all of the rollers, means for mounting the disks for movement of the adjacent faces thereof relative to the roller axis and for equalizing roller pressures on the disks, and means for moving the disks toward and away from the rollers while maintaining the given relation with the roller axis one of the disks being rotatively relatively fixed and the other of said disks being mounted for relatively free rotation.

4. In a power transmission for changing a variable speed to a constant speed and vice versa, a housing, a variable speed shaft, rollers subjected to centrifugal force by rotation of the variable speed shaft, a constant speed shaft, gearing connecting the rollers to the constant speed shaft, a pair of disks severally engageable with each of the rollers, means for mounting the disks for movement in a given relation with the plane of the roller axes and at an angle to such plane, and means movably engaging the housing for moving the disks toward and away from each other, said disks being shaped to provide an outwardly convergent annular path for the rollers.

5. In a power transmission for changing a variable speed to a constant speed and vice versa, a housing, a variable speed shaft, rollers subjected to centrifugal force by rotation of the variable speed shaft, a constant speed shaft, gearing connecting the rollers to the constant speed shaft, means mounting the disks for movement in a given angular relation with the plane including the several axes of the rollers and at an angle to such plane, a yoke threadedly and severally engaging with the disks, and means movably mounted in the housing for rotating the yoke and thereby moving the disks toward and away from the plane of the roller axes.

6. In a power transmission for changing a variable speed to a constant speed and vice versa, a variable speed shaft, rollers subjected to centrifugal force by rotation of the variable speed shaft, a constant speed shaft, gearing connecting the rollers to the constant speed shaft, a pair of opposed disks for movement in a fixed angular relationship with the roller axes, means for moving the disks equally and oppositely toward and away from the rollers, and means for equalizing the pressure between the several contacting surfaces of the rollers and the disks.

7. In a power transmission for changing a variable speed to a constant speed and vice versa, a housing, a variable speed shaft, a cage extending radially from the shaft, rollers mounted on and movable in the cage radially of the shaft for subjecting the rollers to a variable centrifugal force upon rotation of the variable speed shaft, the rollers having a friction surface at an angle to the roller axes, a constant speed shaft, gearing connecting the rollers with the constant speed shaft, movable disks frictionally engaging the rollers, the disks having adjacent surfaces at the angle of the roller friction surfaces and severally having splines, toothed rings movably mounted on the housing for severally engaging the disk splines, a member movably in the housing for acting on the rings and thereby moving the disks toward and away from each other, means movably mounted on the housing and engaging the ring-actuating member for adjusting the rings and thereby moving the disks toward and away from the rollers, and gearing connecting the disks for equalizing the pressure between the rollers and the disks and for transmitting torque reactions therebetween.

8. In a power transmission for changing a variable speed to a constant speed and vice versa, a stationary housing, a first shaft rotatably mounted in the housing, rollers driven by and movable on radii of the first shaft, disks movable toward and away from each other for frictional contact peripherally with the several rollers at diametrically opposite points thereof, one disk being rotatable and one disk being non-rotatable relative to the housing, means for moving the disks and thereby varying the positions of the rollers radially of the first shaft, gearing connected with the rotatable disk and driven thereby, the gearing being engageable with the housing for transmitting reaction torques from the disks to the housing, and a second shaft connnected with the rollers for rotation thereby at speeds dependent upon the positions of the rollers radially of the first shaft.

9. In a power transmission for changing a variable speed to a constant speed and vice versa, a stationary housing, a first shaft rotatably mounted in the housing, rollers mounted and movable on shafts positioned on radii of the first shaft, disks radially outwardly convergent and movable toward and away from each other for frictional contact peripherally with the several rollers at diametrically opposite points thereof, one disk being rotatable and one disk being non-rotatable relative to the housing, means for moving the disks and thereby varying the positions of the rollers radially of the first shaft, a gear connected with and driven by the rotatable disk, a gear mounted on the housing, an idler gear connecting the said gears for transmitting reaction torque on the non-rotatable disk through the gears to the housing, speed to a constant speed and vice versa, a stationary and a second shaft connected to the rollers for rotation thereby at a speed dependent on the position of the rollers radially of the shaft.

10. In a power transmission for changing a variable housing, a first shaft rotatably mounted in the housing, rollers mounted and movable on shafts disposed on radii of the first shaft, disks having radially outwardly convergent surfaces and movable toward and away from each other for frictional contact peripherally with the several rollers at diametrically opposite points thereof, one disk being rotatable and one disk being non-rotatable relative to the housing, means for moving the disks and thereby varying the positions of the rollers radially of the first shaft, a gear mounted on the first shaft for rotation relative thereto and driven by the rotatable disk, a gear fixed on the housing, idler gears severally associated with the rollers and connecting the said gears for transmitting reaction torque between the disks and through the gears to the housing, and a second shaft connected with the rollers for rotation thereby at a speed dependent on the position of the rollers radially of the first shaft.

11. In a device of the character described, a relatively stationary housing having centrally aligned shafts therethrough and an infinite ratio transmission mounted in the housing for power drive from one shaft to the other, the housing having a cylindrical flange encompassing one of the shafts to provide internally of the housing a mount for a portion of the transmission, an annular mount slidably receivable upon one of the shafts in spaced relation to the cylindrical flange and engageable with the housing to prevent rotation on the shaft, an annular threaded transmission adjusting collar slidable on the cylindrical flange and a threaded surface on the annular mount, a hollow ellipsoidal yoke having margins threaded to engage the threaded collar and threaded annular mount, the parts being threaded to move the collar and mount equally and oppositely upon rotation of the yoke, and transmission apparatus within the hollow yoke for power transmission from one shaft to the other, said apparatus including spoke-like shafts extended radially from one of the shafts and provided with centrifugally responsive rollers connected to pinions forming part of a gear connection with a gear on the other shaft, a friction surfaced disk mounted to the collar for movement therewith whereby to move the friction surface against the rollers, said friction surface being at an angle to the spoke shafts for outward radially convergence theretoward whereby to adjustably restrict the radius of the circumferential path to be travelled by the rollers and to change the ratio of the power drive from shaft to shaft.

12. The device of claim 11 wherein two friction disks face one another and one is mounted to the threaded collar and the other is mounted to the annular mount, one of said disks having bearing surfaces for free rotation with respect to the member on which it is mounted, the two disk surfaces being outwardly radially convergent.

13. The device of claim 11 in which the housing and the yoke are adjustably interconnected for threaded adjustment of the margins of the yoke in relation to the mounts and each of the mounts has a disk mounted thereto for equal movement to and from the other in response to such adjustment.

14. In a power transmission, a drive shaft, a driven shaft coaxial with the drive shaft, the disks being axially spaced and having opposed faces converging outwardly from the shafts, rollers urged outwardly upon rotation of the drive shaft into pressure contact and in rolling engagement with the opposed faces of the disks, gearing connecting the rollers with the driven shaft for rotation thereof, and means for adjusting the spacing of the disks for thereby controlling positioning of the rollers radially of the disks and varying the speed of rotation of the driven shaft.

15. In a power transmission, a drive shaft, a driven shaft coaxial with the drive shaft, a pair of disks coaxial with the shafts, the disks being axially spaced and having opposed faces converging outwardly from the shafts, rollers urged outwardly upon rotation of the drive shaft into pressure contact and rolling engagement with the opposed faces of the disks, gearing connection the rollers with the driven shaft for rotation thereof, at least one of the disks being rockably mounted for equalizing pressure of the individual rollers on the disks, and means for adjusting the spacing of the disks for thereby controlling positioning of the rollers radially of the disks and varying the speed of rotation of the driven shaft.

16. In a variable speed transmission, the combination of coaxial driving and driven shafts, a pair of opposed disks disposed coaxially of and spaced axially of the shafts, a set of planet rollers in rolling engagement with and between the disks, one of the disks being rockably mounted to effect pressure contact thereof with the individual rollers of the set of planet rollers, means for mounting the rollers for movement radially of the disks to vary the relative motion between the rollers and the disks, gearing connecting the rollers with the drive shaft for rotation thereof, and means for achieving the spacing of the disks for thereby controlling the positioning of the rollers radially of the disks and for varying the speed of rotation of the driven shaft.

17. In a power transmission, a drive shaft, a driven shaft coaxial with the drive shaft, a pair of disks coaxial with the shafts, the disks being axially spaced and having opposed faces converging outwardly from the shafts, rollers movable into pressure contact and rolling engagement with the opposed faces of the disks, means for mounting the rollers on the drive shaft for rotation thereby and movement radially thereof, gearing connecting the rollers with the drive shaft for rotation of the rollers and connected with one of the disks for rotation thereof and means for adjustably spacing the disks for thereby controlling positioning of the rollers radially of the disks and varying the speed of rotation of the driven shaft.

18. In a power transmission, a drive shaft, a driven shaft coaxial with the drive shaft, a pair of disks coaxial with the shafts, the disks being axially spaced and having opposed faces converging outwardly from the shafts, rollers movable upon rotation of the drive shaft into pressure contact and rolling engagement with the opposed faces of the disks, gearing connecting the rollers with the driven shaft for rotation thereof, means for rendering the gearing responsive to relative motion between the disks and the rollers, and means for adjusting the spacing of the disks for thereby controlling positioning of the rollers radially of the disks and varying the speed of rotation of the driven shaft.

19. In a power transmission, a drive shaft, a driven shaft coaxial with the drive shaft, a pair of disks coaxial with the shafts, the disks being axially spaced and having opposed faces converging outwardly from the shafts, rollers mounted on and movable upon rotation of the drive shaft into pressure contact and rolling engagement with the opposed faces of the disks, gearing connecting the rollers with the driven shaft for rotation thereof, and rotary means coaxial with the shafts for moving the disks equally and oppositely toward and away from each other.

20. In a power transmission, a drive shaft, a driven shaft coaxial with the drive shaft, a pair of disks coaxial with the shafts, the disks being axially spaced and having opposed faces converging outwardly from the shafts, one of the disks being rotatable relative to the other disk, rollers movable upon rotation of the drive shaft into pressure contact and in rolling engagement with the opposed faces of the disks, gearing connecting the rollers with the driven shaft for rotation thereof, and means for adjusting the spacing of the disks for thereby controlling positioning of the rollers radially of the disks and varying the speed of rotation of the driven shaft.

21. In a variable speed transmission, the combination of coaxial driving and driven shafts, a pair of opposed disks disposed coaxially of the shafts and in axially spaced relation thereof, one of the disks being rotary and the other disk being non-rotary, means interconnecting the disks for movement thereof to vary the axial spacing therebetween a set of planet rollers in rolling engagement with and between the pair of disks, means for mounting the rollers for movement radially of the disks to vary the planetary action of the rollers, planetary gearing connecting the shafts the planetary gearing including a pinion revolving with the driving shaft, and means for rendering the planetary gearing responsive to variations in the planetary action of the rollers, whereby the speed ratio between the shafts is varied by movement of the rollers radially of the disks.

22. In a power transmission, a drive shaft, a driven shaft coaxial with the drive shaft, a pair of disks coaxial with the shafts, the disks being axially spaced and having opposed faces converging outwardly from the shafts, rollers mounted on and movable upon rotation of the drive shaft into pressure contact and in rolling engagement with the opposed faces of the disks, gearing connecting the rollers with the driven shaft for rotation thereof, means for holding one disk against rotation relative to the rollers, means for connecting the other disk for relative movement of the disks and relative movement of the said other disk relative to the rollers, and means for adjusting the spacing of the disks for thereby controlling positioning of the rollers radially of the disks and varying the speed of rotation of the driven shaft.

23. In a variable speed transmission, the combination of coaxial driving and driven shafts, a pair of opposed disks disposed axially of the shafts, a set of planet rollers rotated by the driving shaft in pressure contact with and between the disks, means interconnecting the disks to determine the axial spacing therebetween, the disks and the interconnecting means therefor being axially movable as a unit to equalize the pressures between the disks and the rollers, the rollers being adjustable radially of the disks to vary the rate of relative motion between the disks and the rollers, gearing connecting the rollers with the driven shaft for rotation thereof and means responsive to variation in the rate of relative motion between the disks and the rollers for varying the speed ration between the shafts.

24. In a variable speed transmission, the combination of driving and driven shafts, a pair of opposed coaxial disks in axially spaced relation and coaxial with the shafts, means interconnecting the disks for movement thereof to vary the axial spacing therebetween a single set of planet rollers each in rolling engagement with and between both of the disks and movable radially thereof to vary the rate of relative motion between the rollers and the disks, planetary gearing connecting the shafts, the planetary gearing including a pinion revolving with the driving shaft, and means for rendering the gearing responsive to variation in relative motion between the rollers and the disks, whereby the speed ratio between the shafts is varied by adjustment of the rollers.

25. In a power transmission for changing a variable speed to a constant speed and vice versa, a variable speed shaft, rollers subjected to centrifugal force by rotation of the variable speed shaft, a constant speed shaft, gearing connecting the rollers and the constant speed shaft, and adjustable means acting on the rollers to vary rate of rotation thereof, said adjustable means including a disk mounted for roller travel thereagainst and overhanging the rollers radially from the axis of the variable speed shaft for controlling radial outward motion of the rollers from the axis of the variable speed shaft, and means for moving the disk for varying the distance of the path of rollers travel from the axis of the variable speed shaft whereby the centrifugal force imposed on the rollers is varied.

26. In a variable speed and power transmission, a driving shaft, a driven shaft, spoke-like members extending radially from one of the shafts, rollers mounted on and movable axially of the spoke-like members and subjected to centrifugal force by rotation of the driving shaft, gearing connecting the rollers with the other of the shafts, and adjustable means acting on the rollers to vary rate of rotation thereof, said adjustable means including a disk mounted for roller travel thereagainst and overhanging the rollers radially from the axis of the variable speed shaft for controlling radial outward motion of the rollers from the axis of the variable speed shaft, and means for moving the disk for varying the distance of the path of roller travel from the axis of the driven shaft whereby the centrifugal force imposed on the rollers is varied.

27. In a variable speed power transmission, a driving shaft, a driven shaft, spoke-like members extending from one of the shafts, rollers mounted on and movable axially of the spokes and subjected to centrifugal force by rotation of the driving shaft, the rollers having a peripheral edge at an angle to the axis of the rollers, gears connecting the rollers with the other of the shafts, disks mounted in spaced relation with the rollers therebetween and movable into frictional engagement with the rollers, the disks having their outer peripheries closer together than their inner portions for confining the rollers to a selected path of circular travel thereon, and means for moving the disks for varying the distance of the path of roller travel from the axis of the driving shaft whereby the centrifugal force imposed on the rollers is varied.

28. In a variable speed power transmission, a driving shaft, a driven shaft, spoke-like members extending from one of the shafts, rollers mounted on and movable axially of the spoke-like members and subjected to centrifugal force by rotation of the driving shaft, movable disks adjustably and frictionally engaged with the rollers at either side thereof to define an annular path with outwardly convergent walls, pinion gears rotatably mounted on each of the spoke-like members and driven by the rollers, a bevel gear engaged by the pinion gears and keyed to the driven shaft, and means for moving the disks and varying the distance of the path of roller travel from the axis of the driving shaft whereby the centrifugal force imposed on the roller is varied.

29. In a power transmission for changing a variable speed to a constant speed and vice versa, a driving shaft, a driven shaft, spoke-like members extending radially from one of the shafts, rollers mounted on and movable axially of the spoke-like members, pinion gears severally and rotatably mounted on the spoke-like members, the pinion gears severally having an externally splined hub extension severally enclosing the spoke-like members, a gear ring keyed to the driven shaft and engaged by the pinion gears, disks having outwardly convergent frictional surfaces movable toward and away from each other and frictionally engaging the rollers, and means for moving the disks for varying the distance of the rollers from the axis of the driving shaft and thereby varying the centrifugal force acting upon the rollers.

References Cited in the file of this patent

UNITED STATES PATENTS

| | | |
|---|---|---|
| 725,899 | Watt | Apr. 21, 1903 |
| 888,761 | Snyder et al. | May 26, 1908 |
| 1,736,932 | Meynier | Nov. 26, 1929 |
| 1,797,953 | Gessner | Mar. 24, 1931 |
| 2,029,042 | Turner | Jan. 28, 1936 |
| 2,079,681 | Chilton | May 11, 1937 |
| 2,100,630 | Chilton | Nov. 30, 1937 |
| 2,209,497 | Winger et al. | July 30, 1940 |